United States Patent
Levy et al.

(10) Patent No.: US 11,711,453 B2
(45) Date of Patent: Jul. 25, 2023

(54) TEMPLATE-BASED PACKET PARSING

(71) Applicant: MELLANOX TECHNOLOGIES, LTD., Yokneam (IL)

(72) Inventors: Gil Levy, Hod Hasharon (IL); Liron Mula, Ramat Gan (IL); Barak Gafni, Sunnyvale, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/508,998

(22) Filed: Oct. 24, 2021

(65) Prior Publication Data

US 2023/0127568 A1 Apr. 27, 2023

(51) Int. Cl.
*G06F 15/173* (2006.01)
*H04L 69/22* (2022.01)
*H04L 69/324* (2022.01)
*H04L 69/323* (2022.01)

(52) U.S. Cl.
CPC ............ *H04L 69/22* (2013.01); *H04L 69/323* (2013.01); *H04L 69/324* (2013.01)

(58) Field of Classification Search
CPC ...... H04L 69/22; H04L 69/324; H04L 69/323
USPC .................................................. 709/203, 224
See application file for complete search history.

(56) References Cited

U.S. PATENT DOCUMENTS

| | | | |
|---|---|---|---|
| 5,394,394 A | 2/1995 | Crowther et al. | |
| 6,308,219 B1 | 10/2001 | Hughes | |
| 6,356,951 B1 | 3/2002 | Gentry, Jr. | |
| 6,504,842 B1 | 1/2003 | Bergenfeld | |
| 6,705,533 B2 | 4/2004 | Venkatraman et al. | |
| 6,788,680 B1 | 9/2004 | Perlman et al. | |
| 6,807,172 B1 | 10/2004 | Levenson et al. | |
| 7,333,484 B2 | 2/2008 | Henderson et al. | |
| 7,623,468 B2 | 11/2009 | Panigrahy et al. | |
| 7,921,046 B2 | 4/2011 | Parsons et al. | |
| 8,161,468 B2 | 4/2012 | Todd | |
| 8,694,448 B2 | 4/2014 | Mandelbaum et al. | |
| 9,209,990 B1 | 12/2015 | Szabo et al. | |
| 10,015,090 B2 | 7/2018 | Arad et al. | |
| 10,616,111 B1 | 4/2020 | Immidi et al. | |

(Continued)

OTHER PUBLICATIONS

Gibb et al., "Design Principles for Packet Parsers", ACM/IEEE Symposium on Architectures for Networking and Communications Systems (ANCS), pp. 1-12, Oct. 2013.

(Continued)

*Primary Examiner* — Duyen M Doan
(74) *Attorney, Agent, or Firm* — Kligler & Associates Patent Attorneys Ltd

(57) ABSTRACT

A parsing apparatus includes a packet-type identification circuit and a parser. The packet-type identification circuit is to receive a packet to be parsed, and to identify a packet type of the packet by extracting a packet-type identifier from a defined field in the packet. The parser is to store one or more parsing templates that specify parsing of one or more respective packet types. When the packet type of the packet corresponds to a parsing template among the stored parsing templates, the parser is to parse the packet in accordance with the stored parsing template. When the packet type of the packet does not correspond to any of the stored parsing templates, the parser is to parse the packet using an alternative parsing scheme.

15 Claims, 6 Drawing Sheets

(56) References Cited

U.S. PATENT DOCUMENTS

| | | | |
|---|---|---|---|
| 10,701,190 B2 | 6/2020 | Kfir et al. | |
| 10,757,230 B2 | 8/2020 | Kfir et al. | |
| 2003/0043848 A1 | 3/2003 | Sonksen | |
| 2003/0074388 A1 | 4/2003 | Pham et al. | |
| 2004/0081101 A1 | 4/2004 | Bennett | |
| 2004/0088430 A1 | 5/2004 | Busi et al. | |
| 2004/0218528 A1* | 11/2004 | Shipman | H04L 45/42 370/232 |
| 2005/0089016 A1 | 4/2005 | Zhang et al. | |
| 2005/0108617 A1 | 5/2005 | Lappin | |
| 2006/0062144 A1 | 3/2006 | Testa et al. | |
| 2007/0140297 A1 | 6/2007 | Chung et al. | |
| 2007/0276952 A1 | 11/2007 | Mitchell | |
| 2008/0025308 A1 | 1/2008 | Morgan et al. | |
| 2008/0095149 A1 | 4/2008 | Dai | |
| 2009/0097418 A1 | 4/2009 | Castillo et al. | |
| 2011/0149895 A1 | 6/2011 | Sala et al. | |
| 2012/0159132 A1* | 6/2012 | Abel | G06F 9/3885 712/229 |
| 2013/0022128 A1 | 1/2013 | Symes | |
| 2013/0128885 A1 | 5/2013 | Kardashov et al. | |
| 2013/0215906 A1 | 8/2013 | Hidai | |
| 2015/0081726 A1 | 3/2015 | Izenberg | |
| 2015/0081833 A1 | 3/2015 | Pettit et al. | |
| 2015/0156288 A1 | 6/2015 | Lu et al. | |
| 2015/0172189 A1 | 6/2015 | Pitchai et al. | |
| 2015/0256456 A1 | 9/2015 | Previdi et al. | |
| 2015/0341265 A1 | 11/2015 | Basso et al. | |
| 2016/0028860 A1* | 1/2016 | Rubin | H04L 69/324 370/474 |
| 2016/0094667 A1 | 3/2016 | Jani | |
| 2016/0139892 A1 | 5/2016 | Atreya et al. | |
| 2016/0197852 A1 | 7/2016 | Hutchison et al. | |
| 2016/0285759 A1* | 9/2016 | Ryan | H04L 69/22 |
| 2017/0064047 A1 | 3/2017 | Bosshart | |
| 2017/0168970 A1 | 6/2017 | Sajeepa et al. | |
| 2017/0180253 A1 | 6/2017 | Koren et al. | |
| 2017/0286292 A1 | 10/2017 | Levy et al. | |
| 2018/0198809 A1* | 7/2018 | Kushwaha | H04L 63/1416 |
| 2018/0242218 A1 | 8/2018 | Muscariello et al. | |
| 2018/0287941 A1 | 10/2018 | Louzoun et al. | |
| 2018/0288197 A1 | 10/2018 | Izenberg | |
| 2018/0288614 A1 | 10/2018 | Zaks et al. | |
| 2019/0004701 A1 | 1/2019 | Guim Bernat et al. | |
| 2019/0042489 A1* | 2/2019 | Nagabhushana | G06F 3/0679 |
| 2019/0073719 A1 | 3/2019 | Parsons et al. | |
| 2019/0123984 A1 | 4/2019 | Nainar et al. | |
| 2019/0132421 A1 | 5/2019 | Fedyak | |
| 2019/0140979 A1 | 5/2019 | Levi et al. | |
| 2019/0207860 A1* | 7/2019 | York | H04L 41/0681 |
| 2020/0293487 A1* | 9/2020 | Anderson | H04L 9/3263 |
| 2021/0176345 A1 | 6/2021 | Urman et al. | |
| 2021/0306257 A1 | 9/2021 | Dutta | |
| 2021/0328923 A1 | 10/2021 | Urman et al. | |

OTHER PUBLICATIONS

Deering et al., "Internet Protocol, Version 6 (IPv6) Specification", Request for Comments: 2460, pp. 1-39, Dec. 1998.

University of Southern California, "Darpa Internet Program", Protocol Specification, Request for Comments 791, pp. 1-50, Sep. 1981.

Cheng et al., "Telco Distributed DC with Transport Protocol Enhancement for 5G Mobile Networks," working paper, Karlstad University, Faculty of Health, Science and Technology, pp. 1-58, Dec. 2017.

Mula et al., U.S. Appl. No. 17/160,407, filed Jan. 28, 2021.

* cited by examiner

SERIAL TEMPLATE-BASED PARSER (SERIAL-TBP)

PARALLEL TEMPLATE-BASED PARSER (PARALLEL-TBP)

TEMPLATE-BASED PACKET PARSING

FIELD OF THE INVENTION

The present invention relates generally to data communication, and particularly to methods and systems for efficient packet parsing.

BACKGROUND OF THE INVENTION

In various communication devices and applications, the headers of packets contain information indicative of how the packets should be processed and forwarded.

Methods for parsing packets are known in the art. For example, U.S. Pat. No. 7,623,468 describes a parsing processor that provides instruction-driven content inspection of network packets at 10-Gbps and above with a parsing engine that executes parsing instructions. A state-graph unit traces state-graph nodes to keyword indications and/or parsing instructions. The parsing instructions can be derived from a high-level application to emulate user-friendly parsing logic. The parsing processor sends parsed packets to a network processor unit for further processing.

As another example, in a paper by Glen Gibb et al. entitled "Design Principles for Packet Parsers," ANCS '13: Proceedings of the ninth ACM/IEEE symposium on Architectures for networking and communications systems, October 2013, Pages 13-24, the authors describe trade-offs in parser design, identify design principles for switch and router designers, and describe a parser generator that outputs synthesizable Verilog that is available for download.

SUMMARY OF THE INVENTION

An embodiment of the present invention that is described herein provides a parsing apparatus including a packet type identification circuit and a parser. The packet-type identification circuit is to receive a packet to be parsed, and to identify a packet type of the packet by extracting a packet-type identifier from a defined field in the packet. The parser is to store one or more parsing templates that specify parsing of one or more respective packet types. When the packet type of the packet corresponds to a parsing template among the stored parsing templates, the parser is to parse the packet in accordance with the stored parsing template. When the packet type of the packet does not correspond to any of the stored parsing templates, the parser is to parse the packet using an alternative parsing scheme.

In some embodiments the parser includes (i) a first parsing circuit to parse packets in accordance with the stored parsing templates, and (ii) a second parsing circuit to parse, using the alternative parsing scheme, packets that do not match any of the stored parsing templates. In a disclosed embodiment, the parser is to parse packets in accordance with the stored parsing templates at a first parsing rate, and to parse packets using the alternative parsing scheme at a second parsing rate that is slower than the first parsing rate.

In an example embodiment, the defined field in the packet, which holds the packet-type identifier, is a Layer-1 Start-of-Packet (SOP) field. In another embodiment, the defined field in the packet, which holds the packet-type identifier, is a Layer-2 Ethertype field. In some embodiments, the parsing template includes one or more anchors that specify locations of one or more header fields, and the parser is to parse the packet in accordance with the anchors.

There is additionally provided, in accordance with an embodiment of the present invention, a network device including a host interface and a packet processor. The host interface is to receive packet data and packet-type indications from a host. The packet processor is to send packets corresponding to the packet data to a network, including writing, in at least some of the packets, packet-type identifiers to a defined field in the packets, responsively to the packet-type identifications.

There is also provided, in accordance with an embodiment of the present invention, a parsing method including receiving a packet to be parsed. A packet type of the packet is identified by extracting a packet-type identifier from a defined field in the packet. When the packet type of the packet corresponds to a stored parsing template, the packet is parsed in accordance with the stored parsing template. When the packet type of the packet does not correspond to any stored parsing template, the packet is parsed using an alternative parsing scheme.

There is further provided, in accordance with an embodiment of the present invention, a method for packet parsing. The method includes storing one or more parsing templates in a memory, each parsing template specifying how to parse packets of a respective packet type. A packet to be parsed is received. A packet type, to which the received packet belongs, is identified by extracting a packet-type identifier from a field in the packet. If the packet type of the received packet, as indicated by the extracted identifier, corresponds to one of the stored parsing templates, the packet is parsed in accordance with the corresponding parsing template. If the packet type of the received packet does not correspond to any of the stored parsing templates, the packet is parsed using an alternative parsing scheme.

The present invention will be more fully understood from the following detailed description of the embodiments thereof, taken together with the drawings in which:

DETAILED DESCRIPTION OF EMBODIMENTS

Overview

Figure 1:
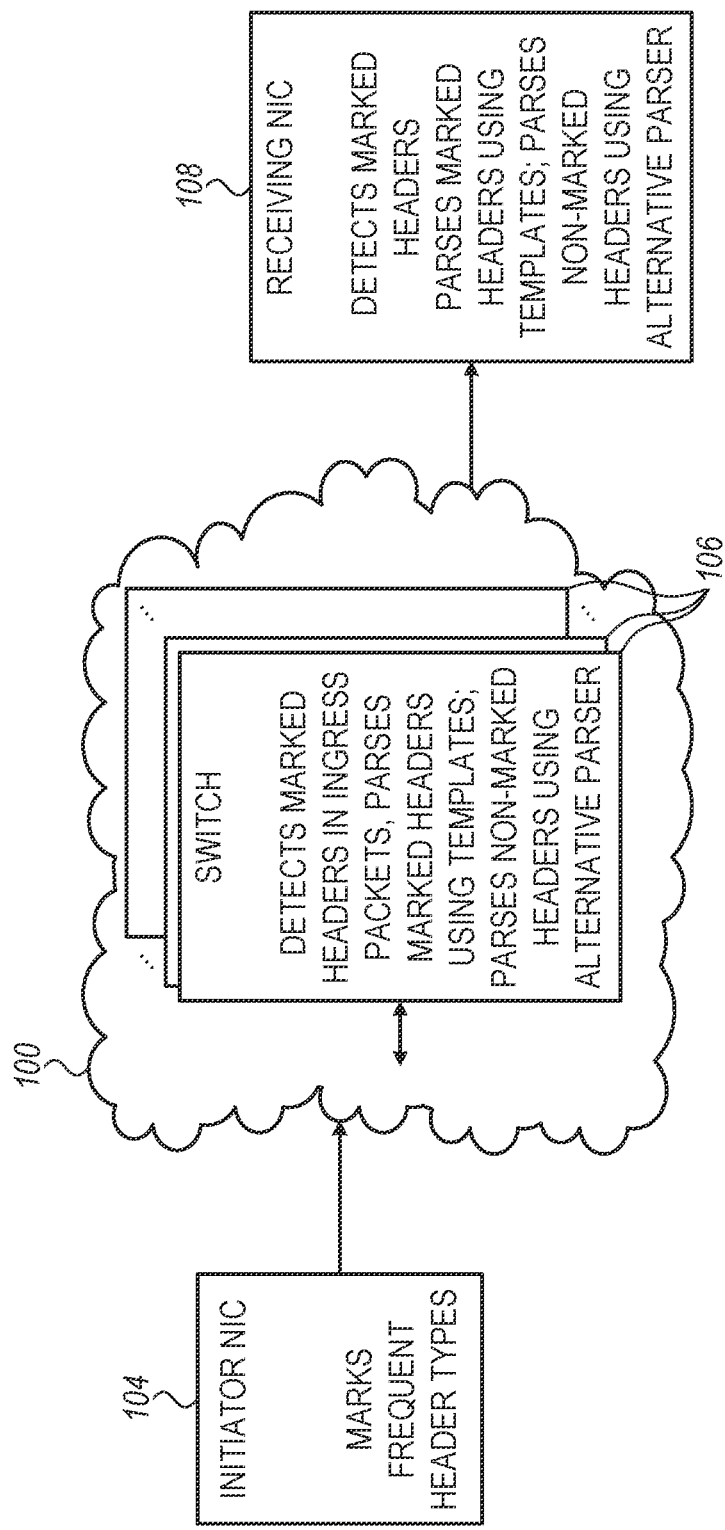
FIG. 1 is a block diagram that schematically illustrates a network, wherein at least some the communication packets are marked for fast parsing, in accordance with an embodiment of the present invention.

Various types of network devices and applications perform packet parsing for determining the processing and forwarding required for the packet. Parsing typically involves identification of certain fields in a header of the packet, e.g., fields related to the underlying communication protocols used.

In modern network devices, parsers are typically required to support a large variety of packet types. Moreover, increasing bandwidth demands such as in data centers and in High-Performance Computing (HPC) increase parsing rate demands accordingly.

Header fields of the packet header may indicate various packet parameters. As an example, a packet in an Ethernet network may have a packet type denoted MAC-IPV6 or MAC-IPV4, for example. As another example, a packet encapsulated in a Virtual Local Area Network (VLAN) may have a packet type denoted MAC-VLAN-IPV4-UDP. In specifying a packet type, a header field of one protocol typically points to the next field of another protocol.

A parser supporting a large variety of packet types may identify a packet type by scanning the packet header in accordance with a predefined graph in which the nodes correspond to the supported packet types. Parsers of this sort, however, are typically implemented using a Finite-State Machine (FSM), which is not fast enough to meet parsing rate demands.

In principle, parsing rate could be increased, for example, by assigning multiple parsing-engines to different subsets of the packets belonging to a common packet stream. This solution would typically involve packet reordering before or after parsing. Another approach for increasing the parsing rate could be based on parsing packets on demand, e.g., parse only when a certain field of a packet header is needed. The main disadvantages of the example approaches described above include increased complexity, increased latency and high cost in terms of ASIC area and power consumption.

The packet types of packets traversing a communication network are typically distributed nonuniformly. Characteristics of transport protocols used in data centers are described, for example, by Jun Cheng & Karl-Johan Grinnemo, in paragraph 4.2 of a survey entitled "Telco Distributed DC with Transport Protocol Enhancement for 5G Mobile Networks," Karlstad University, Faculty of Health, Science and Technology, December 2017.

The inventors discovered experimentally that traffic in real-life networks may be dominated by only a small subset of the entire packet types supported. For example, a field experiment showed that 99% of the packets in some ports had a MAC-VLAN-IPV6-TCP type. In other ports, 70% of the packets had a MAC-VLAN-IPV6-UDP type (possibly with high-layer protocols that need not be parsed for forwarding), and 30% had a MAC-VLAN-IPV6-TCP type.

Parsing of packets is done predominantly by parsing the packet headers (e.g., extracting in the packet header). We will refer hereinbelow to "header parsing" and "packet parsing" interchangeably. We will further refer interchangeably to the terms "packet type" and "header type" (i.e., the various protocols indicated by the header fields).

Embodiments of the present invention that are described herein provide improved methods and systems for packet parsing. Based on the assumption that, in a given network, a small number of header types that can be a-priori defined dominates most of the traffic ("frequent headers"); in some embodiments an initiating network device, such as a Network Interface Controller (NIC), marks the frequent headers by changing a reserved field in the packet header. In embodiments, the initiating network device further encodes the header type of the frequent headers in reserved fields of the packet header. The reserved header fields may be, in an embodiment, an L1 Start-of-Packet (SOP) field and/or an L2 Ethertype field.

According to some embodiments, a network device that receives communication packets (e.g., a network switch or a NIC at a destination node) may comprise a template-based parser (TBP); the TBP receives packet headers and identifies marked frequent headers. If the header is marked, the TBP parses the header at high-speed, using a predefined template that is selected responsively to the header type (the header type is encoded using reserved combinations of pre-defined header fields). If the header is not marked, the TBP parses the header using an alternative "conventional" parser (which typically takes much longer).

In some embodiments, the TBP parses marked headers using a template, and unmarked headers using a "conventional" parser, at the same time, for yet higher parsing rates. In other embodiments the TBP completes the parsing of a non-marked header before proceeding to parse a marked header, and vice-versa.

In embodiments, each parsing template comprises anchors for the various header fields, and, hence, template-parsing comprises the selection of bit fields in the header that start and end at anchor values independently of each other; thus, bit-field extraction may be done in parallel for all bit fields of the header (although, in practice, as the header received serially, bit-field extraction for some of the fields may be delayed. until the network device receives the respective fields)

According to an embodiment, an initiating network device comprises a packet builder; the packet builder receives, from a host, the header-parameters, and the payload of packets to be sent, over the network, and, for frequent headers, a frequent header indication and a packet-type. The packet builder builds a packet header according to the header-parameters; if the header is a frequent header, the packet builder encodes the packet type in one or more reserved bit fields of the header.

Thus, according to embodiments, fast header parsing can be achieved in networks by marking frequent headers at the initiating network device, and template-parsing the frequent headers by the receiving network device.

System Description

Universal packet parsing, which parses ingress packets according to fields in the packet headers, may be complex and take a long time to execute. For example, practical universal parsing may be hierarchical, in the sense that the parsing of a first header field is needed to find an anchor to a second header field, and so on.

An example parsing technique is described in U.S. patent application Ser. No. 17/160,407, filed Jan. 28, 2021, which is assigned to the assignee of the present patent application and whose disclosure is incorporated herein by reference. The application describes a parsing apparatus including an interface, which is configured to receive packets belonging to a plurality of predefined packet types; a first parser, which is configured to identify any of the packet types; a second parser, which is configured to identify only a partial subset of the packet types; and a controller, which is configured to receive a packet via the interface, to attempt identifying a packet type of the received packet using the second parser, and in response to detecting that identifying the packet type using the second parser fails, to revert to identify the packet type of the received packet using the first parser.

Embodiments according to the present invention benefit from the observation that, in practical network systems, many of the packet headers use a limited number of packet header types. In embodiments, such frequent headers are marked by a source network device ("the initiating network device"), using reserved fields in the packet header. In an embodiment, the marking may include a code that identifies a header type. A destination network device then identifies the marked packet headers, parses the marked headers using a fast template-based parser, and the non-marked headers using a "conventional" parser (e.g., a hierarchical parser).

FIG. 1 is a block diagram that schematically illustrates a network 100, wherein at least some of the communication packets are marked for fast parsing, in accordance with an embodiment of the present invention. Network 100 may be Ethernet, InfiniBand™ or any other suitable switching communication network. An initiator Network Interface Controller (NIC) 104 sends communication packets over network 100. It should be noted that initiator NIC 104 may be replaced, in alternative embodiments, with any other suitable network-connected device that sends communication packets over the network; for example, a Host Channel Adapter (HCA) in InfiniBand™ networks, or a switch. The initiator NIC marks frequently used headers; the group of frequently used headers is predefined and known to other devices that are connected to network 100.

Network 100 comprises switches 106 that route communication packets through the network. Some (or all) of the switches may include circuitry to detect the marked packet headers, parse such headers using a fast template-based parser and parse other headers using an alternative, slower parser.

Receiving NICs 108 may receive communication packets from the network. At least some of the receiving NICs may include, similarly to switches 106, circuitry to detect the marked packet headers, parse such headers using a fast template-based parser and parse other headers using an alternative parser. Like initiator NIC 104, receiving NIC 108 may be replaced, in alternative embodiments, with any other suitable network-connected device that receives communication packets from the network; for example, a Host Channel Adapter (HCA) in InfiniBand™ network.

The example embodiment illustrated in FIG. 1 and described hereinabove is confined, for the sake of conceptual clarity, to unidirectional communication, from the initiator NIC through the switches to the receiving NIC. Embodiments according to the present invention, however, include the more practical case wherein at least some of the NICs are bidirectional, and include the functions of the initiator and the receiving NICs as described hereinabove.

Figure 2A:
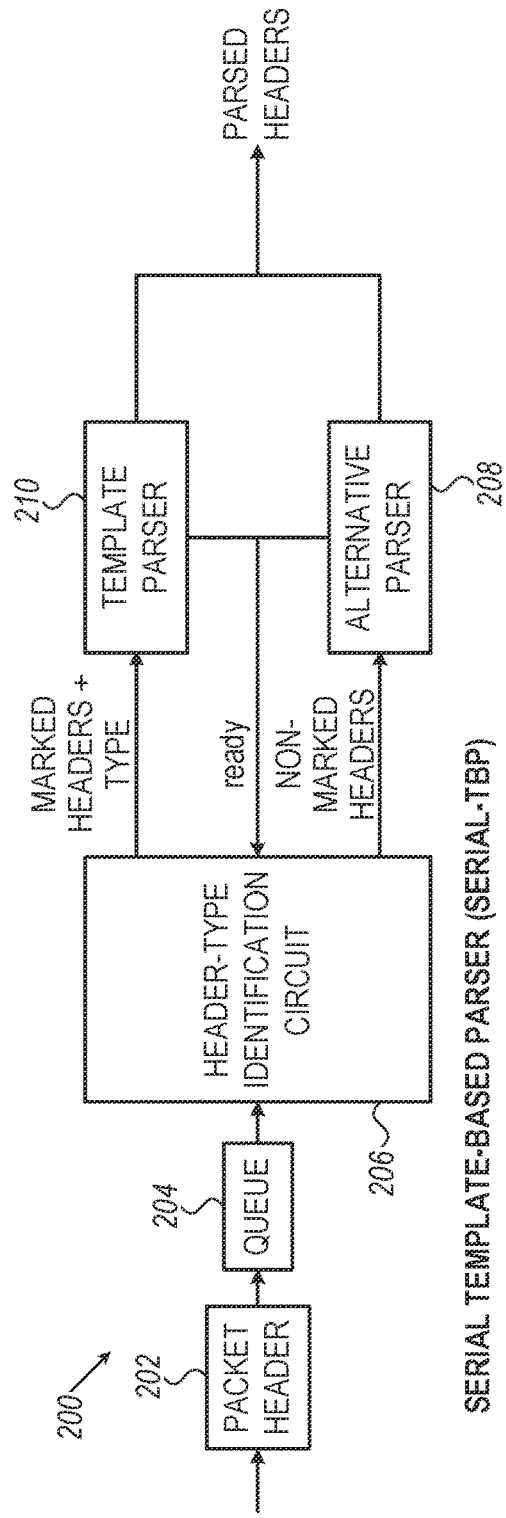
FIG. 2A is a block diagram that schematically illustrates a serial template-based parser, in accordance with an embodiment of the present invention.

FIG. 2A is a block diagram that schematically illustrates a serial template-based parser (serial-TBP) 200, in accordance with an embodiment of the present invention. Serial-TBP 200 can be used in any suitable network device or application that parses packets for deciding on packet processing and forwarding, e.g., a network switch, a network router, a network adapter such as a Network interface Controller (NIC) and the like. The network device or application typically includes network ports to communicate packets over the network, packet processors, buffers, and others; such additional circuits may be omitted in some of the figures herein, for the sake of conceptual clarity.

Figures 3, 4:
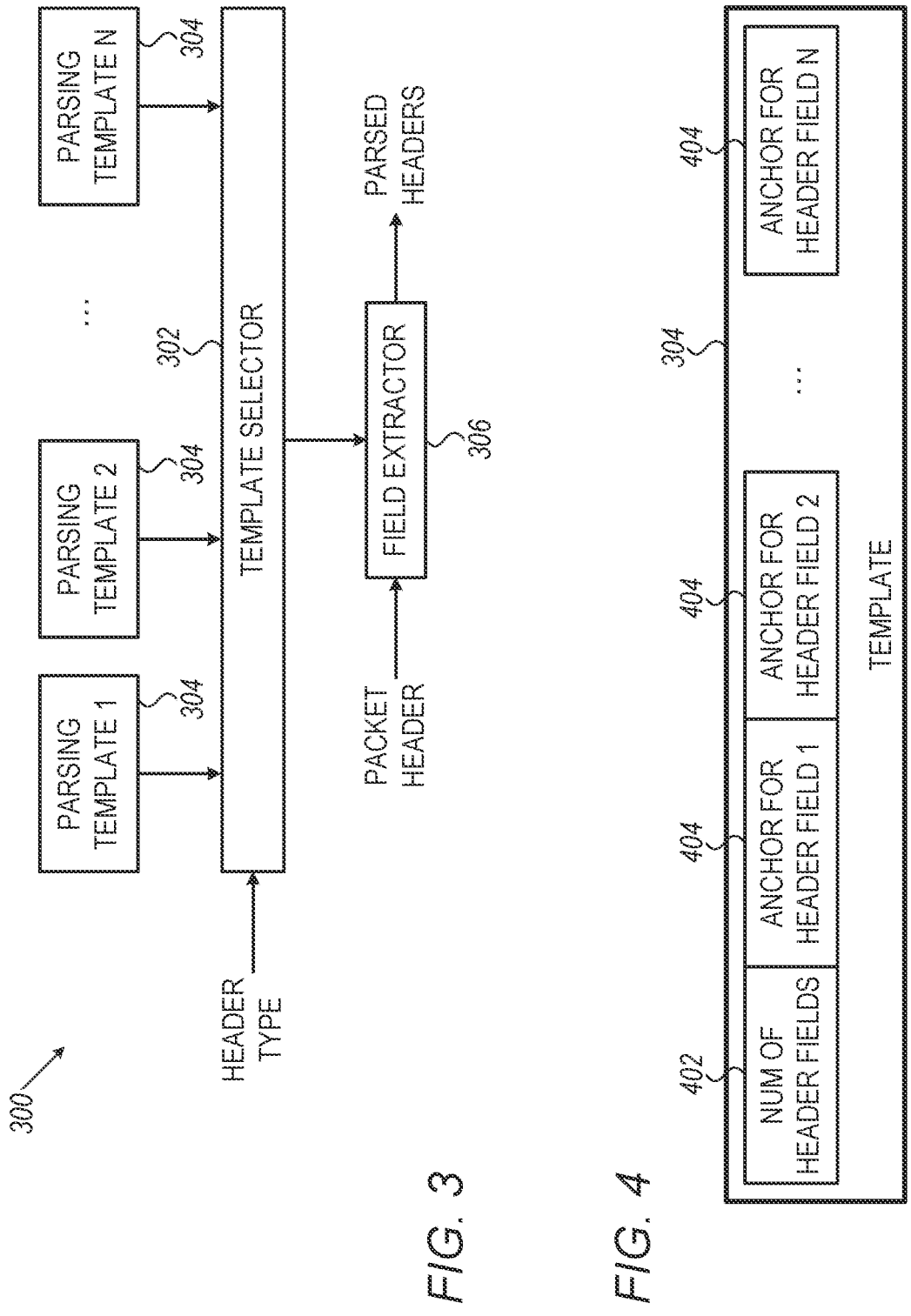
FIG. 3 is a block diagram that schematically illustrates a template-based parser, in accordance with an embodiment of the present invention.
FIG. 4 is a diagram that schematically illustrates a header parser template, in accordance with an embodiment of the present invention.

Serial-TSP 200 receives packets, including packet headers 202, (e.g., from a network port of a network device) and temporarily stores the headers in a rate-matching queue 204. A packet-type identification circuit 206 then reads the packet headers from queue 204, and detects, by inspecting predefined header fields, if the headers are marked. If the headers are marked, the packet-type identification circuit sends the packet header and a packet-type indication to a fast template parser 210, which parses the headers using preset templates. If the headers are not marked, the packet-type identification circuit sends the packet headers to a slower alternative parser 208, (e.g., a hierarchical parser). As most of the packet headers are expected to be marked, most of the header parsing will be done by the template-based parser, and the average parsing rate will be significantly increased. An example implementation of a fast template parser is shown in FIG. 3 below.

According to the example embodiment illustrated in FIG. 2A, header type identification circuit 206 sends new headers to template-based parser 210 or to alternative parser 208 after the parsing of the previous header is completed (indicated by the Ready input). Alternatively, the two parsers can work in parallel.

Figure 2B:
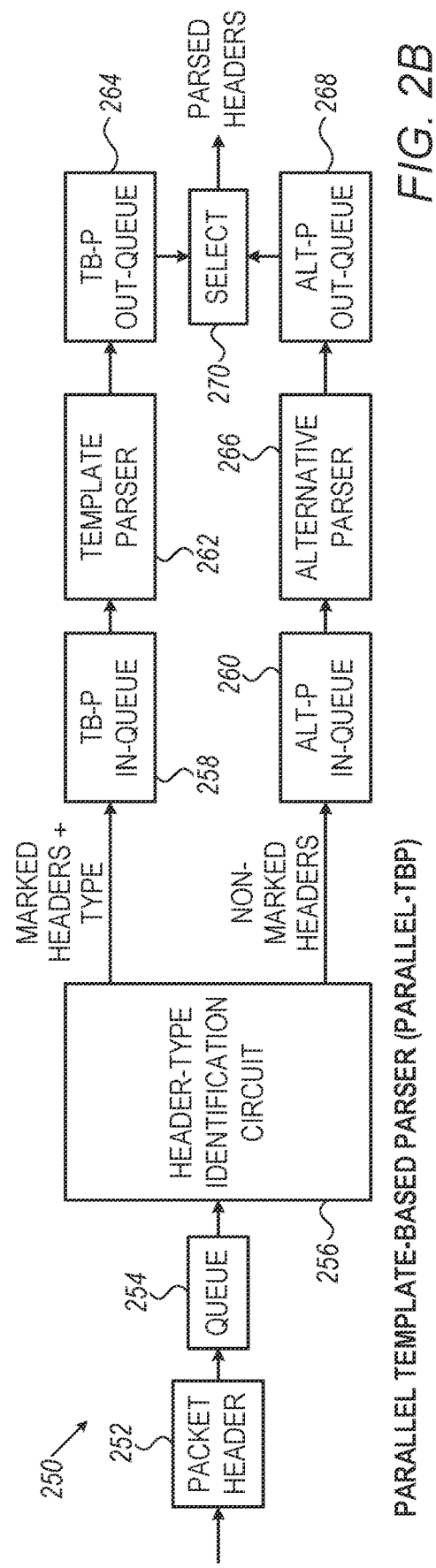
FIG. 2B is a block diagram that schematically illustrates a parallel template-based parser, in accordance with an embodiment of the present invention.

FIG. 2B is a block diagram that schematically illustrates a parallel template-based parser (parallel-TBP) 250, in accordance with an embodiment of the present invention. Parallel-TBP 250, too, can be used in any suitable network device or application that parses packets for deciding on packet processing and forwarding, e.g., a network switch, a network router, or a network adapter such as a NIC.

The parallel-TBP receives packet headers 252 (e.g., from a network port that is not shown), and temporarily stores the packet headers in a rate-matching queue 254. Packet identifier 256 identifies marked and unmarked headers and sends the headers (with header-type codes) accordingly, to a template-based-parser in-queue (TB-P in-queue) 258, or to an Alternative Parser in-queue (ALT-P in-queue) 260. Unlike header-type identification circuit 206 (FIG. 2A), header-type identification circuit 256 does not wait for the parsing to be completed. Instead, the header-type identification circuit can send headers as long as the corresponding queue is not full.

A template parser 262 parses the marked headers according to predefined templates and sends the parsed headers to a template-based parser out-queue (TB-P out-queue) 264, whereas an alternative parser 266 parses the non-marked headers, (e.g., hierarchically), and sends the parsed headers to an alternate-parser out-queue (ALT-P out-queue) 268. Lastly, a selector 270 reads parsed headers from queues 264, 268, and sends the parsed headers for further processing.

Thus, according to the embodiments illustrated in FIGS. 2A, 2B and described hereinabove, a packet parser can parse pre-marked packets at a high average rate, using a template parser for frequent packets headers and an alternative parser for the non-marked headers. A further rate improvement can be obtained by parallel operation of the template-based and the alternative parsers (FIG. 2B).

The embodiments illustrated in FIGS. 2A, 2B are example embodiments that are cited for the sake of conceptual clarity. Other suitable embodiments may be used in alternative embodiments. For example, in some embodiments, queues 204 and 254 store complete packets and are also used for packet forwarding. In some embodiments, header-type identification circuits 206 and 256 only detect if the packet is marked; the detection of the packet type of marked headers is done by the template parser.

As another example, the template parser (210 or 262) and the alternative parser (208 or 266) need not necessarily be implemented as two separate units. More generally, the disclosed techniques can be described as carried out by a parser having two different parsing schemes—(i) a template-based parsing scheme used for packets of types having corresponding parsing templates, and (ii) an alternative parsing scheme for packets that do not correspond to any of the stored parsing templates. The present disclosure refers to "two parsers" and to "a parser having two parsing schemes" interchangeably.

The parsed headers according to the example embodiment illustrated in FIG. 2B may be output out-of-order (e.g., a header of a packet that arrives first may complete parsing earlier than the header of a packet that arrives later). In an embodiment, this undesirable and, hence, selector 270 comprises circuitry to read parsed headers from queues 264 or 268 according to the packet input order.

FIG. 3 is a block diagram that schematically illustrates a template parser 300, in accordance with an embodiment of the present invention. Template parser 300 can be used as template parser 210 (FIG. 2A) or as template parser 262 (FIG. 2B), for example.

The template parser receives packet headers and packet type indications from header-type identification circuit 206 or 256 (FIGS. 2A, 2B). The header type is input to a template selector circuit 302, which selects one of predefined parsing templates 304. Each parsing template 304 corresponds to a unique packet type that a peer network device encodes in the packet header.

The selected parsing template is input to a field extractor 306 that extracts the header fields according to the templates, and outputs the parsed header (e.g., the separate header fields) for further processing, either directly (FIG. 2A), or through a queue (e.g., TB-P out-queue 264, FIG. 2B). (It should be noted that, in some embodiments, field extractor 306 may be shared by the template parser and the alternative parser.)

FIG. 4 is a diagram that schematically illustrates a header parser template 304 (FIG. 3), in accordance with an embodiment of the present invention. The template is designed to allow parallel parsing of all header fields (as opposed to parsing a first field to get parsing information for the next field, which is the case in hierarchical parsing).

The template comprises a Number-of-Header-Fields field 402, which defines the number of header fields in the corresponding header type, and an Anchor field 404 for each of the header fields. In some embodiments, anchor fields 404 also comprise an anchor-type field (not shown in the figure, for clarity).

The extraction of the header fields from the header may be done in parallel for all header fields; assuming the header fields are contiguous, header-field i is a bit-field in the header, starting at Anchor(i-1) and ending at Anchor(i)-1. In practice, however, since the network device receives the headers serially, the extraction of some of the fields may be deferred until the fields are input to the network device.

The structure of template 304 illustrated in FIG. 4 and described herein is cited by way of example. Other suitable structures may be used in alternative embodiments. For example, in some embodiments, each header field 404 comprises and anchor value and a length value; in other embodiments, the header field comprises a start and an end anchor (e.g., when parsing includes rearranging of the fields and, hence, the end anchor of a field may be remote from the start anchor of the next field). In some embodiments, the number of fields is fixed for all marked packet types, and the number-of-fields field 402 is not needed. In yet other embodiments, a Valid indicator may be added to header fields 404.

Figure 5:
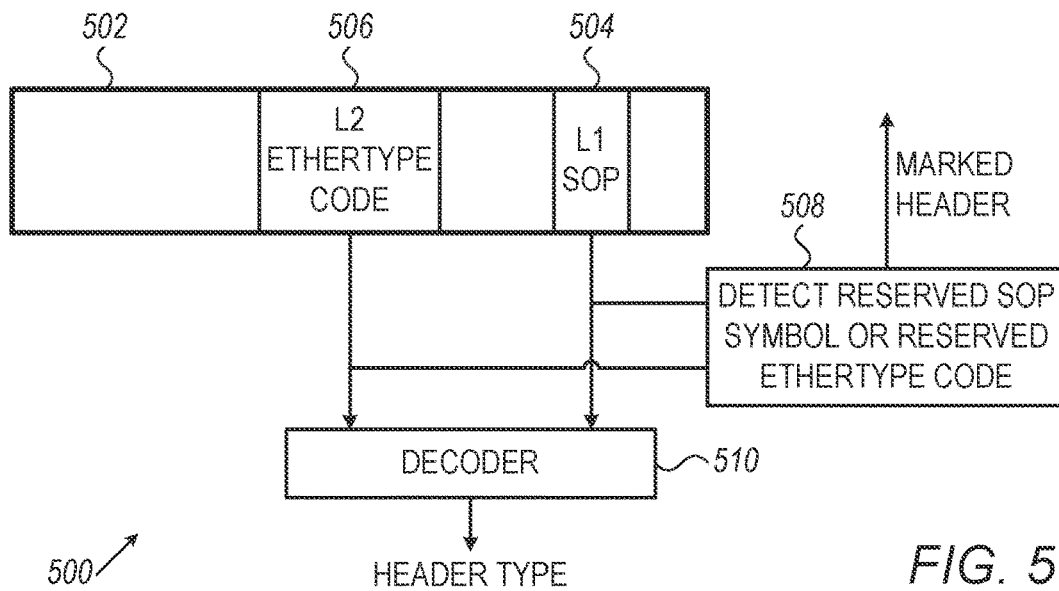
FIG. 5 is a diagram that schematically illustrates a marked packet header and decoding thereof, in accordance with an embodiment of the present invention.

FIG. 5 is a diagram 500 that schematically illustrates a marked packet header and decoding thereof, in accordance with an embodiment of the present invention. A header 502 comprises a plurality of header fields, including an L1 Start-of-Packet (SOP) field 504 and an L2 Ethertype field 506.

A SOP symbol is transmitted by the PHY layer to indicate start-of-frame. Typically, the SOP is fixed for a given protocol; however, in proprietary environments (e.g., a High-Performance Computing (HPC) architecture), other SOP symbols may be used.

EtherType is a 16-bit field in an Ethernet frame, used to indicate which protocol is encapsulated in the payload of the frame and for VLAN tagging. Some of the $2^{16}$-bit combinations of the Ethertype field are not used (i.e., illegal, reserved, or undefined). (Ethertype is used in Ethernet; other fields may be used in other protocols.)

In the example embodiment illustrated in FIG. 5, either SOP field 504 or Ethertype field 506, or both, can be used to mark a packet header. A detect circuit 508 (e.g., header-type indication circuit 206, FIG. 2A) detects if either SOP field 504 or Ethertype code field 506 include, respectively, a reserved SOP symbol or a reserved Ethertype (the "reserved" above refers to any illegal, undefined, or reserved value), and, responsively, indicates a marked header. A decoder 510 can decode the coding of SOP field 504 and Ethertype field 506 and generate a packet-type code.

In embodiments, detect circuit 508 and/or decoder 510 includes dedicated fast circuitry that extracts the SOP and Ethertype fields without fully parsing the header. For example, when SOP is used, SOP is always the first layer-1 byte and hence easily extracted. For another example, when Ethertype is used, as the Ethertype is always sent after the Virtual Local Area Network (VLAN) tagged packets, the fast circuitry will detect the number of VLAN tags.

The structure of marked packet header 502 illustrated in FIG. 5 and described hereinabove is cited by way of example. Other suitable structures may be used in alternative embodiments. For example, in some embodiments, other header fields may be used to mark frequent headers, additionally or alternatively to fields 504 and 506. In some embodiments, reserved combinations of different header field values may be used co mark the header. In an embodiment, decoder 510 decodes the header type and, additionally, signals if the header is marked (and, hence, detect circuit 508 may be omitted).

Figure 6:
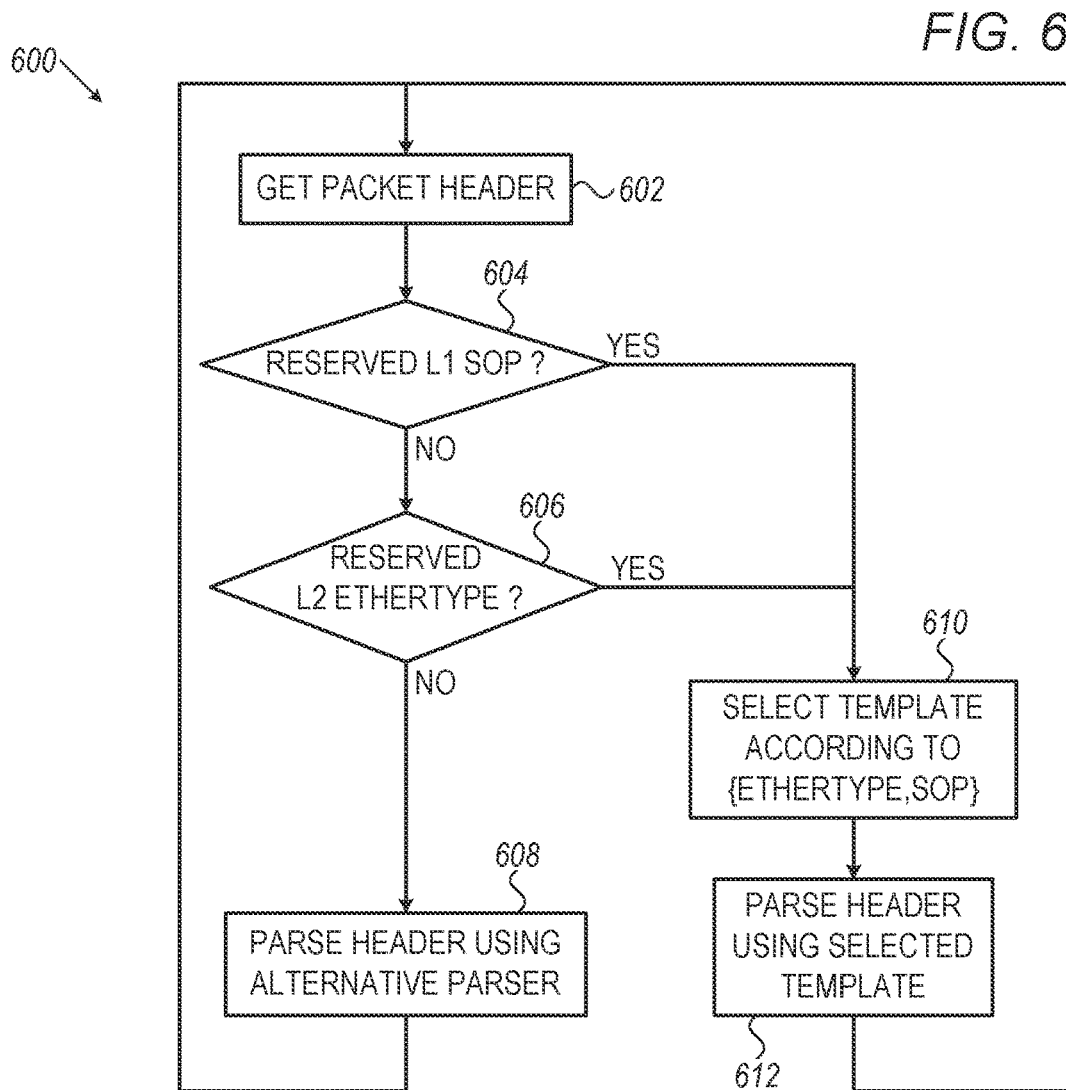
FIG. 6 is a flowchart that schematically illustrates a method for template-based packet header parsing, in accordance with an embodiment of the present invention.

FIG. 6 is a flowchart 600 that schematically illustrates a method for template-based header parsing, in accordance with an embodiment of the present invention. The flowchart is executed by a template based parser (TBP); e.g., serial-TBP 200 (FIG. 2A) or paraliel-TBP 250 (FIG. 2B). In the example embodiment illustrated in FIG. 6, the combination of reserved codes in the SOP and/or the Ethertype fields denotes a marked header and encodes the marked-header type; in alternative embodiments, only one of the SOP, Ethertype fields may be used; in other embodiments, other fields may be used for the marking and the encoding of frequent headers.

The flowchart starts with a get-packet-header operation 602, wherein the TBP receives the header of the packet to be parsed (e.g., header 202, FIG. 2A.). Next, in a check-reserved-SOP operation 604, the TBP checks if the code at the L1 SOP header field is a reserved SOP code. If the SOP code is not a reserved SOP code (e.g., the standard SOP code is used), the TBP proceeds to a check-reserved-Ethertype operation 606 and checks if the Ethertype code is a reserved code. If the Ethertype code is not reserved, the TBP enters a parse-using-alternative-parser operation 608 and parses the header using the alternative parser (e.g., a hierarchical parser).

If the SOP code in operation 604 or the Ethertype code in operation 606 are reserved codes, the TBP enters a Select Template operation 610, and selects a template that corresponds to the header type, which is determined responsively to The SOP and the Ethertype codes. The TBP will then, in a template-parse operation 612, use the selected template to rapidly parse the header.

After operations 608 and after operation 612, the TBP reenters operation 602, to parse the next header.

Thus, according to the example embodiment illustrated in FIG. 6 and described hereinabove, a TBP can parse packet headers at a high rate, using a fast template parser for the more frequent marked headers, and a slower alternative parser for the non-marked headers.

The structure of flowchart 600 illustrated in FIG. 6 and described above is an example embodiment that is cited for the sake of conceptual clarity. Other flowcharts may be used in alternative embodiments. For example, in some embodiments not all the reserved SOP and/or Ethertype codes may be used to mark headers; the TBB comprises a list of reserved codes that are used to mark headers; upon encountering a reserved SOP or Ethertype code that is not in the list, the TBB may signal an error (e.g., to a host) and abort the parsing of the current header.

In embodiments, template parsing 612 and alternative parsing 608 may be done in parallel (for different headers), as disclosed with reference to FIG. 2B above.

A Numerical Example

The advantages of parsing using the disclosures described above will now be demonstrated, using a numerical example.

Let Tt and Ta denote the average heard parsing time (e.g., in nano-second/header), of template parser 210 and alternative parser 208, respectively (FIG. 2A). We assume that Ta>>Tt.

Let Ft and Fa denote the relative frequencies of, respectively, marked and unmarked headers (Ft+Fa=1).

In an example application, we assume that the relative occurrence frequencies of header types are as follows:
Type 0—50%
Type 1—30%
Types 2 to 6—12% (total)
Other Types—8%

We further assume that the template parser is, on the average, four times faster than the alternative parser (that is—Ta/Tt=4).

If only types 0 and 1 (80% of the headers) are marked, we get parsing time of 0.8*Tt+0.2*Ta=0.4*Ta, or a 2.5 speed-up ratio (over an alternative parser only).

If all types 0 through 6 are marked (and, hence, template-parsed), we get a parsing time of:

0.92*Tt 0.08*Ta=0.31*Ta, or an approximately, 3.2 speed-up ratio.

It should be noted that, in addition to the speedup, silicon area (and, hence, power consumption) is saved. Alternatively, the saved silicon area/power consumption may be used to implement additional circuitry, e.g., for yet faster parsing.

Marking Packet Headers at the Initiating Network Device

We described below, with reference to FIGS. 2A through 6, embodiments of the present invention that parse marked headers at high speed. In embodiments, the packet headers are marked for template parsing by an initiating network device that marks frequent headers and sends packets with marked headers over the network (see, for example, initiator NIC 104, FIG. 1).

Figure 7:
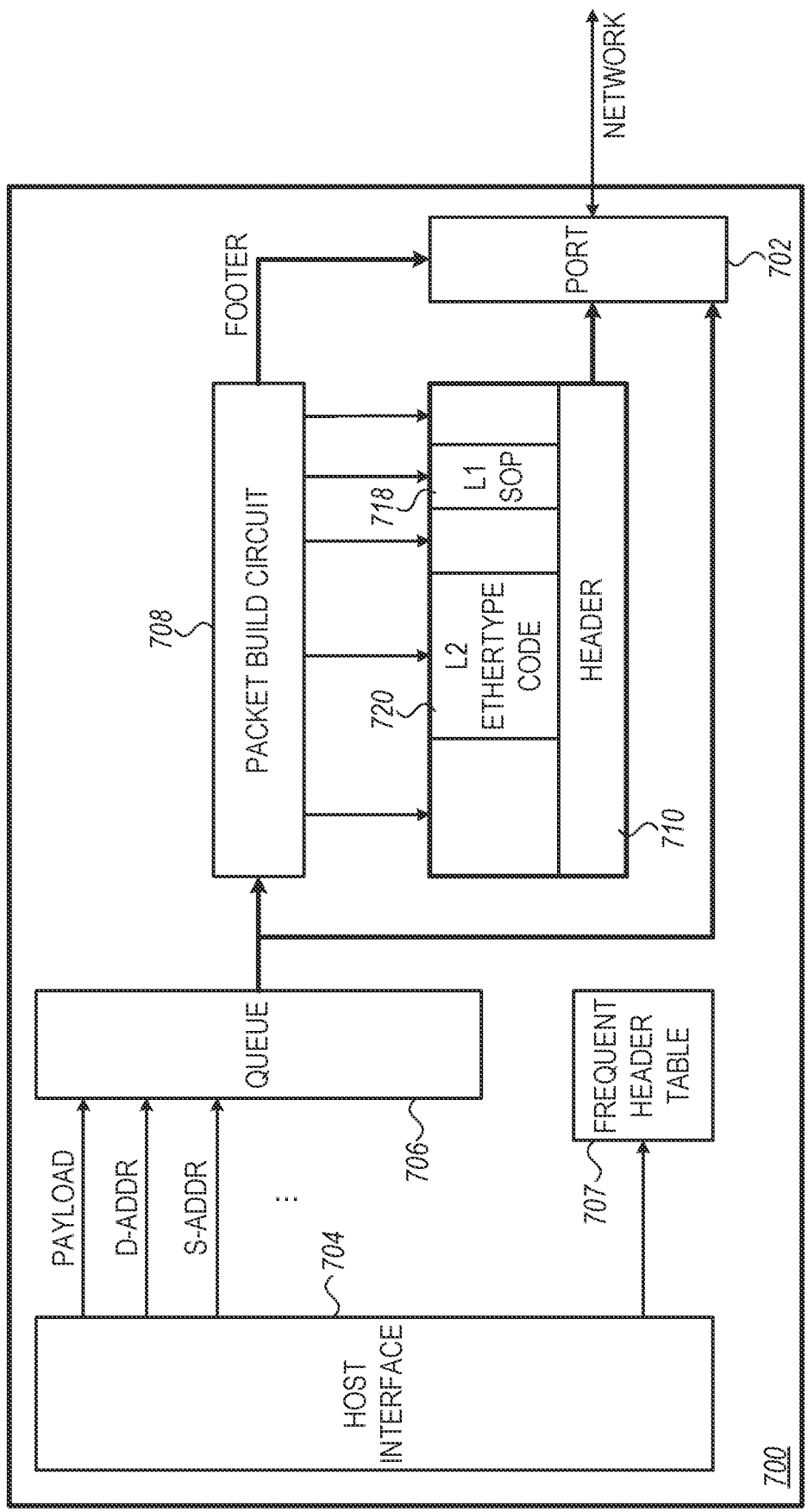
FIG. 7 is a block diagram that schematically illustrates a network device for sending packets with marked frequently occurring headers, in accordance with an embodiment of the present invention.

FIG. 7 is a block diagram that schematically illustrates a network device 700 for sending packets with marked frequent headers, in accordance with an embodiment of the present invention. The network device comprises a port 702 that communicates packets over a communication network, a hosts-interface 704, a queue 706 and a packet-builder circuit 708.

Network device 700 may receive from a host, through host interface 704, instructions to send a packet over the network. The instructions may include packet parameters such as a destination address, a source address, etc., and the packet payload. The network device temporarily stores the instructions in a queue 706.

According to the example embodiment illustrated in FIG. 7, the host pre-sends a list of frequent header types to the network device; the network device stores the list in a frequent header table 707, and checks if header types that the network device receives from the queue are frequent (and, hence, may be template-parsed by a receiving network device).

When ready to build a next packet, the packet builder reads the instructions from queue 706, and builds a suitable packet header 710 (e.g., in a register). The packet header includes fields to store a source address, a destination address and other header fields, as indicated by the host instruction that the packet builder reads from the queue. If the header is a frequent header (and, hence, stored in the frequent-header table 707), the packet builder encodes the header types in L1 SOP field 718 and/or in L2 Ether type field 720.

When the header is ready, the network device sends the header, followed by the payload (from queue 706) through port 702, to the network. The packet builder may calculate a packet footer (e.g., Cyclic Redundancy Code-CRC), and append the footer to the payload.

Thus, a network device according to the example embodiment illustrated in FIG. 7 can send packets that are marked for fast template-based parsing by a peer network device.

The structure of network device 700 is cited by way of example. Other structures may be used in alternative embodiments. For example, in some embodiments, a host prepares the entire packet, including the packet header. In another embodiment, the network device does not include a frequent-headers table and, instead, the host may add a frequent-header (and frequent header-type) indication to the headers that the host sends to the network device. In an embodiment, the packet footer is neither calculated and appended by the packet builder but, rather, calculated and appended by other circuits of the network element (e.g., by port 702).

In embodiments, packet building may be accelerated using a technique that is similar to the packet parsing techniques described above—the packet builder may include template headers, to be used for marked headers; if the host indicates that the header should be marked, the packet builder, rather than building the header, will only fill the various fields with data provided by the host.

Figure 8:
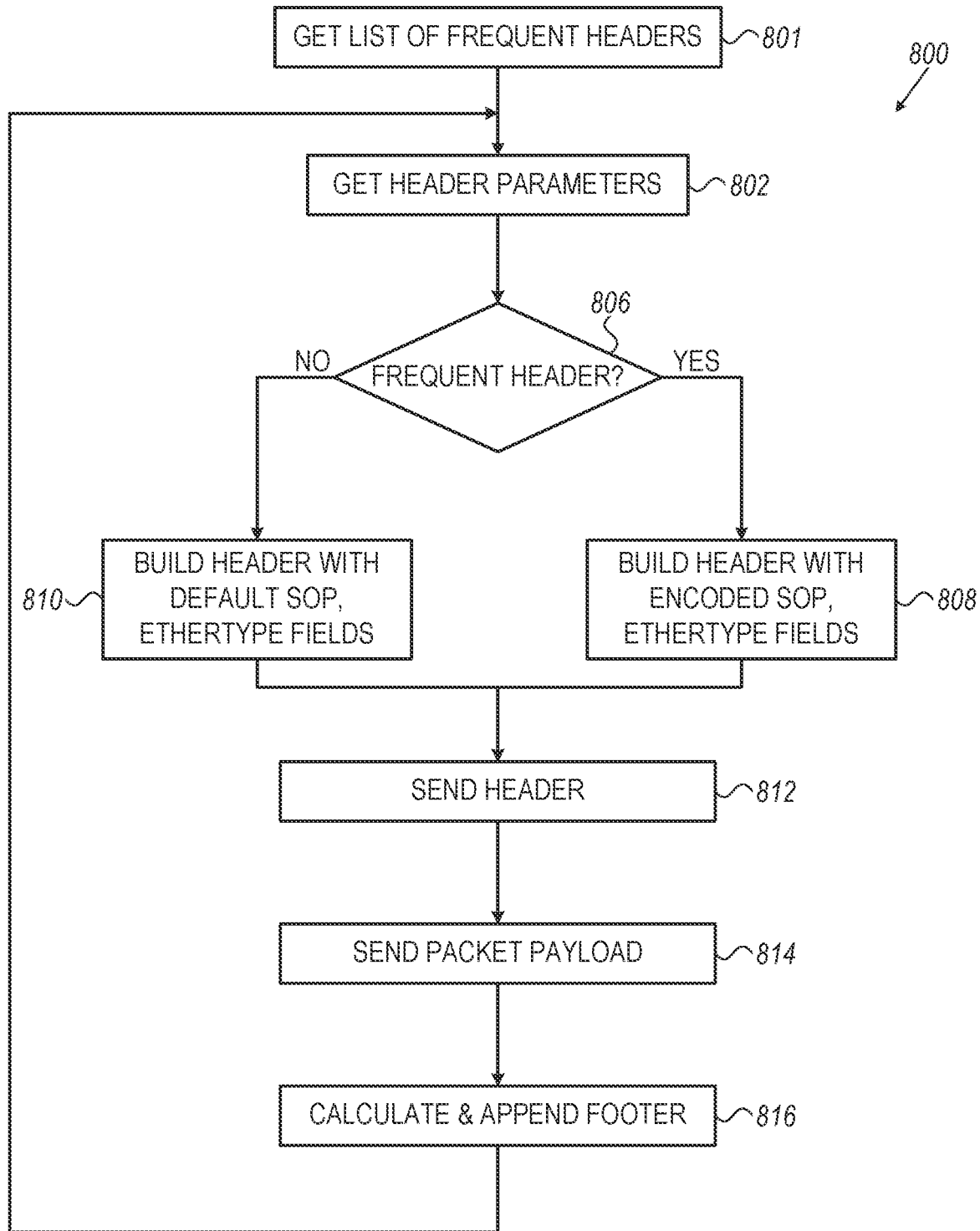
FIG. 8 is a flowchart that schematically illustrates a method for generating packets with marked frequently occurring headers, in accordance with an embodiment of the present invention.

FIG. 8 is a flowchart 800 that schematically illustrates a method for generating packets with marked frequent headers, in accordance with an embodiment of the present invention. The flowchart is executed by packet builder 708 (FIG. 7).

The flowchart starts at a get list of frequent headers operation 801, wherein the packet builder gets a list of frequent header types from, the host and stores the list in table 707 (FIG. 7). Next, the packet builder enters a get header parameters operation 802, wherein the packet builder receives (e.g., from a host, via queue 706) the parameters of the next packet to be sent. The header parameters comprise items that are typically encoded in header fields and may include a 5-tuple (source address, source port, destination address, destination port and protocol), as well as other header fields.

Next, at a check-marked-header operation 806, the packet builder compares the header to the list of frequent headers, to check if the header should be marked. If so, the packet builder enters a build-header-with-encoded-fields operation 808, builds the packet-header and fills the various fields according to the header parameters that the host specifies; the packet builder also encodes the L1 SOP field and/or the L2 Ethertype field with reserved codes, responsively to the specified header type (all host parameters are typically received from a host, via host interface 704 and queue 706).

If, in operation 806, the header is not marked, the packet builder will enter a build-header-with-default-fields operation 810 and builds a header according to the header parameters and using non-reserved values for the SOP and Ethertype fields.

After either operation 808 or operation 810, the packet builder, in a send-header operation 812, sends the header, through port 702 (FIG. 7), to the network, and then, in a send-payload operation 814, send the payload. Lastly, in an append-footer operation 816, the packet builder calculates a footer (e.g., CRC) and appends the footer to the payload.

After operation 816, the packet builder reenters operation 802, to send the next packet.

The structure of flowchart 800 illustrated in FIG. 8 and described hereinabove is cited by way of example. Other suitable flowcharts may be used in alternative embodiments. For example, in embodiments, preparing a header for a packet may be done concurrently with sending the payload of a previous packet. In other embodiments, some, or all of operations 808, 810 and 816 may be done by the host, which may send filled or partially filled header fields to the packet processor.

The configuration of initiator NIC 104, switches 106, receiving NIC 108, serial-TBP 200, parallel-TBP 250, template parser 300, parsing template 304, marked-header decoding circuit 500, template-based parsing method 600, initiator network device 700 and templated packet generation method 800, are example configurations and methods that are shown purely by way of illustration. Any other suitable configurations and methods can be used in alternative embodiments.

In various embodiments, the template-based parsing circuitry of the receiving network device, and/or, the packet building circuitry of the initiating network device described hereinabove may be carried out by hardware, by software, or by a combination of hardware and software.

In various embodiments, the different elements of initiator NIC 104, switch 106 and receiving NIC 108, may be implemented using suitable hardware, such as one or more Application-Specific integrated Circuits (ASIC) or Field-Programmable Gate Arrays (FPGA), or a combination of ASIC and FPGA.

Each of initiator NIC 104, switch 106 and receiving NIC 108 may include one or more processors; the processors typically comprise one or more general-purpose processors, which are programmed in software to carry out at least part of the functions described hereinabove. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents is a manner that conflicts with the definitions made explicitly or implicitly in the present specification, only the definitions in the present specification should be considered.

The invention claimed is:

1. A parsing apparatus, comprising:
   a packet-type identification circuit to:
      receive a packet to be parsed; and
      identify a packet type of the packet by extracting a packet-type identifier from a defined field in the packet; and
   a parser to:
      store one or more parsing templates that specify parsing of one or more respective packet types, in a manner allowing parallel parsing of all header fields;
      when the packet type of the packet corresponds to a parsing template among the stored parsing templates, parse the packet in accordance with the stored parsing template; and
      when the packet type of the packet does not correspond to any of the stored parsing templates, parse the packet using an alternative parsing scheme,
      wherein the alternative parsing scheme comprises a hierarchical parsing scheme, in which information from parsing of a first field is required for parsing a next field.

2. The parsing apparatus according to claim 1, wherein the parser comprises:
   a first parsing circuit to parse packets in accordance with the stored parsing templates; and
   a second parsing circuit to parse, using the alternative parsing scheme, packets that do not match any of the stored parsing templates.

3. The parsing apparatus according to claim 1, wherein the parser is to:
   parse packets in accordance with the stored parsing templates at a first parsing rate; and
   parse packets using the alternative parsing scheme at a second parsing rate that is slower than the first parsing rate.

4. The parsing apparatus according to claim 1, wherein the defined field in the packet, which holds the packet-type identifier, is a Layer-1 Start-of-Packet (SOP) field.

5. The parsing apparatus according to claim 1, wherein the defined field in the packet, which holds the packet-type identifier, is a Layer-2 Ethertype field.

6. The parsing apparatus according to claim 1, wherein the parsing template comprises one or more anchors that specify locations of one or more header fields, and wherein the parser is to parse the packet by selection of bit fields in the header that start and end at anchor values.

7. A parsing method, comprising:
receiving a packet to be parsed;
identifying a packet type of the packet by extracting a packet-type identifier from a defined field in the packet;
when the packet type of the packet corresponds to a stored parsing template, specifying how to parse packets of a respective packet type, in a manner allowing parallel parsing of all header fields, parsing the packet in accordance with the stored parsing template; and
when the packet type of the packet does not correspond to any stored parsing template, parsing the packet using an alternative parsing scheme,
wherein the alternative parsing scheme comprises a hierarchical parsing scheme, in which information from parsing of a first field is required for parsing a next field.

8. The parsing method according to claim 7,
wherein parsing the packet in accordance with the stored parsing template comprises applying a first parsing circuit; and
wherein parsing the packet using the alternative parsing scheme comprises applying a second parsing circuit.

9. The parsing method according to claim 7,
wherein parsing in accordance with the stored parsing template is performed at a first parsing rate; and
wherein parsing using the alternative parsing scheme is performed at a second parsing rate that is slower than the first parsing rate.

10. The parsing method according to claim 7, wherein the defined field in the packet, which holds the packet-type identifier, is a Layer-1 Start-of-Packet (SOP) field.

11. The parsing method according to claim 7, wherein the defined field in the packet, which holds the packet-type identifier, is a Layer-2 Ethertype field.

12. The parsing method according to claim 7, wherein the parsing template comprises one or more anchors that specify locations of one or more header fields, and wherein parsing the packet is performed by selection of bit fields in the header that start and end at anchor values.

13. A method for packet parsing, the method comprising:
storing one or more parsing templates in a memory, each parsing template specifying how to parse packets of a respective packet type, in a manner allowing parallel parsing of all header fields;
receiving a packet to be parsed;
identifying a packet type, to which the received packet belongs, by extracting a packet-type identifier from a field in the packet;
if the packet type of the received packet, as indicated by the extracted identifier, corresponds to one of the stored parsing templates, parsing the packet in accordance with the corresponding parsing template; and
if the packet type of the received packet does not correspond to any of the stored parsing templates, parsing the packet using an alternative parsing scheme,
wherein the alternative parsing scheme comprises a hierarchical parsing scheme, in which information from parsing of a first field is required for parsing a next field.

14. The parsing apparatus according to claim 1, wherein the parser parses packets of a type that corresponds to a parsing template among the stored parsing templates by parallel parsing of all parsed header fields.

15. The parsing apparatus according to claim 1, wherein the parser parses packets of a type that does not correspond to any of the stored parsing templates using a Finite state machine.

* * * * *